March 26, 1968   J. P. FRANZE   3,375,311
METHOD OF FORMING DECORATIVE THERMOPLASTIC VINYL RESIN SHEETS
Filed June 5, 1963
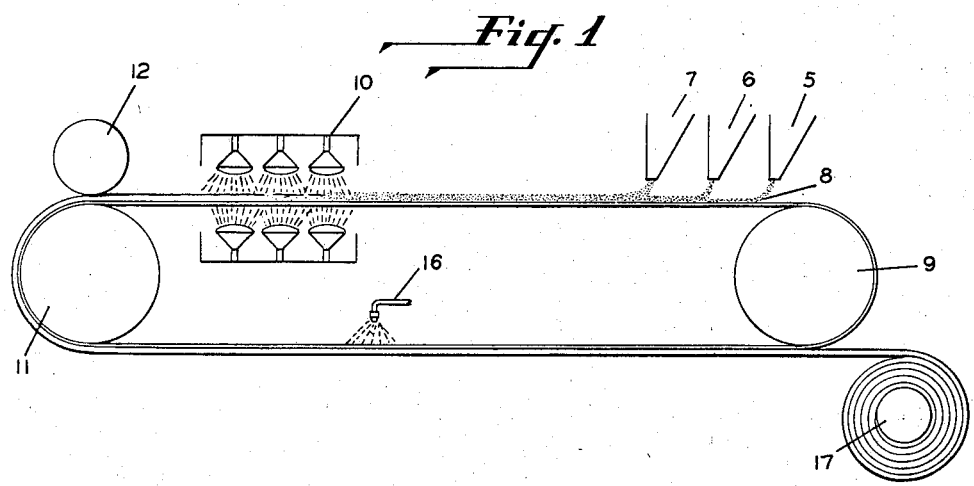
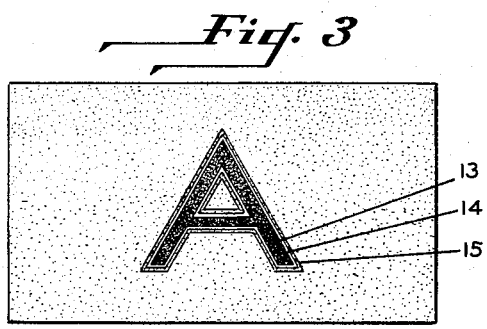
INVENTOR.
JOHN P. FRANZE
BY *William G. Taylor*

3,375,311
METHOD OF FORMING DECORATIVE THERMO-
PLASTIC VINYL RESIN SHEETS
John P. Franze, Lancaster, Pa., assignor to Armstrong
Cork Company, Lancaster, Pa., a corporation of
Pennsylvania
Filed June 5, 1963, Ser. No. 285,665
9 Claims. (Cl. 264—171)

ABSTRACT OF THE DISCLOSURE

A method for forming a multiple layer integral vinyl sheet material in which a plurality of layers of a free-flowing thermoplastic vinyl resin mix of porous particles of unfused thermoplastic vinyl resin, liquid vinyl plasticizer, vinyl stabilizer, pigment and filler, each of the layers being of a composition different from adjacent layers, are laid up on a non-porous carrier, heated to a fluidized condition, and extruded between the carrier and a non-porous consolidating roll, both the carrier and the non-porous consolidating roll being driven at substantially the same speed to minimize mixing between the layers being consolidated therebetween.

---

This invention relates generally to decorative sheets of thermoplastic vinyl resin composition and in particular relates to a method of making integral decorative thermoplastic vinyl resin sheets having a plurality of distinct layers intimately bonded together. The invention also encompasses decorative thermoplastic vinyl resin sheets having a simulated foil appearance with a high metallic luster and a novel method of making same.

Heretofore, when it has been desired to form multiple layer integral vinyl sheets, it has been necessary to form such sheets by laminating a series of preformed sheets together or to preform a sheet of thermoplastic vinyl resin composition and coat additional layers thereover using liquid coating compositions.

The primary object of this invention is to provide a novel method of forming an integral thermoplastic vinyl sheet having distinct layers of differing composition intimately bonded together.

An ancillary object of this invention is to provide a method for forming an integral thermoplastic vinyl sheet starting with a free-flowing mix, the sheet having a plurality of distinct layers which are dependent upon the compositions of the free-flowing mix which goes to form these individual layers.

Still a further object of this invention is to provide a decorative thermoplastic vinyl resin sheet and a method of producing the same in which the sheet has a simulated foil appearance and a high degree of luster and in which the decorative effect is achieved by means of leafing metallic pigments, the layer having the simulated foil effect being encased and protected by substantially transparent or translucent outer resin layers.

These and other objects of this invention will become more apparent from the following description taken in connection with the accompanying drawings wherein:

FIGURE 1 is a diagrammatic side view illustrating the method and apparatus used for producing continuous thermoplastic vinyl resin sheet material in accordance with this invention;

FIGURE 2 is a cross-section view of sheet material produced in accordance with one embodiment of the method of this invention;

FIGURE 3 is a top plan view of a section of the sheet material of FIGURE 2 having portions cut out therefrom and showing the plurality of distinct layers; and FIGURE 4 is a cross-sectional view of a sheet having a simulated foil appearance produced in accordance with this invention.

I have succeeded in forming a decorative thermoplastic vinyl resin sheet which is homogeneously fused throughout and which is comprised of a plurality of distinct layers of differing thermoplastic vinyl resin composition by laying up, on a suitable nonporous carrier, individual layers of a free-flowing mixture comprised of unfused resin particles, having liquid stabilizer and plasticizer absorbed therein, suitable pigment and filler. The layers of free-flowing mixture or mix, on the carrier, are initially heated to fuse the resin particles and form a substantially fluid mass which is then consolidated by extruding the several layers in a nip formed by the nonporous carrier and a nonporous consolidating roll. The action at the nip is one of consolidation and extrusion and is controlled such that the layers are united into a unitary product and the flow resulting from the extrusion at the nip is such that substantially no mixing occurs between the substantially fluid and separately distinct layers which go to form the integral sheet. The consolidated and extruded product is then cooled to form an integral sheet of thermoplastic vinyl resin composition having distinct layers corresponding in composition to the individual layers of mixed dry blended resin, pigment, and filler originally laid up on the nonporous carrier.

In practicing the invention I have found that it is preferable to use a smooth nonporous carrier such as a steel belt and to extrude the substantially fluid resin layers in a nip formed between the steel belt and a nonporous consolidating roll such as a smooth steel calender roll. Generally speaking, the sheel belt and the steel calender roll are preferably driven at substantially the same speed although good sheet formation with substantially little or no mixing between layers can be realized even though the roll and belt are driven at different speeds.

The free-flowing mix of resin, plasticizer, stabilizer, pigment and filler may be readily formed by adding the resin, such as a homopolymer of vinyl chloride, in the form of discrete particles, along with vinyl resin plasticizers, such as dioctyl phthalate, butyl benzyl phthalate, epoxidized soybeans oil or tricresyl phosphate, and suitable vinyl resin stabilizers to a mixer or blender such as a Henschel blender where they are mixed under moderate heat of about 200° F. for a period of time to insure that the plasticizer and stabilizer become diffused throughout the resin particles. Care is taken so that no fusion of the resin particles occurs during the mixing and the mixing step forms a free-flowing mix of resin, plasticizer, stabilizer and filler. This mix is commonly referred to as a vinyl dry blend and is a free-flowing homogeneous mixture of unfused thermoplastic vinyl resin particles, liquid vinyl plasticizers, and vinyl stabilizer. Generally speaking, the addition of fillers and pigments to the mix may be made either initially, at the end of the mixing cycle when the resin particles remain relatively warm, or after the dry blended resin particles have been mixed and cooled. The color of the several layers may be controlled over a wide range and substantially transparent or translucent layers may be incorporated in the finished sheet by omitting the filler and most or all of the pigment from the vinyl dry blend forming these layers. Based on 100 parts by weight of resin, 15 to 30 parts by weight plasticizer, 2 to 5 parts by weight stabilizer, 0 to 5 parts by weight pigment, and 0 to 25 parts by weight filler may be used in forming the free-flowing mixture.

The particles of thermoplastic vinyl resin used in practicing the invention have a relatively large surface area and are generally porous in nature such that they readily absorb the liquid plasticizer and/or liquid stabilizer.

Preferably I use a liquid vinyl stabilizer such as a barium-cadmium phosphate but solid stabilizers such as barium-cadmium laurate may be used equally as well. As the resin, I prefer particles of a vinyl chloride homopolymer prepared by emulsion or suspension polymerization.

In order that the invention may be readily understood, certain embodiments of the method will be described in conjunction with the attached drawings.

PREPARATION OF PLASTICIZED VINYL DRY BLEND

Example 1

The following formula will provide compositions suitable for use as the plasticized vinyl dry blend mixes, all parts being given by weight:

| Ingredients: | Parts by weight |
|---|---|
| Polyvinyl chloride homopolymer (discrete particles of from 150 microns to 50 microns size prepared by suspension polymerization; specific viscosity of .462 as determined by ASTM D–1243–54) | 81.5 |
| Plasticizer—dioctyl phthalate | 9.9 |
| Plasticizer—epoxidized soybean oil | 4.1 |
| Stabilizer—liquid barium-cadmium phosphate | 3.1 |
| Pigment | .2 |
| Filler—ground limestone | 1.2 |

In the preparation of the vinyl dry blend compositions or mixes, the resin, plasticizers and stabilizers set forth above were mixed in Henschel blenders at 220° F. for 3 minutes at the end of which time the ingredients were in the form of discrete dry blend particles. The mild heat causes the plasticizer and stabilizer to be diffused throughout the resin particles without fusing the vinyl resin. At the end of the mixing cycle the pigment and filler were added to the blender to form the desired colored mix and mixed for a period of time sufficient to form a homogeneous mixture. Three separate mixes were formed using the above formulation but varying the pigment, $TiO_2$ being used as the pigment for one mix, a pyrazolone red pigment for the second and a mixed pigment, 1 part carbon black to 5 parts $TiO_2$ for the third.

SHEET FORMATION

In forming the decorative sheet material in accordance with this invention and with reference to the drawing, a layer of vinyl dry blend mix containing red pigment, prepared in accordance with the example, is discharged from the hopper 5 at a rate of 0.10 lb./ft.² on a steel belt 8 driven by means of roll 9. A second layer of vinyl dry blend mix, containing white pigment, prepared in accordance with the example, is discharged from the hopper 6 at a rate of 0.10 lb./ft.² over the first layer, and a third layer of vinyl dry blend mix containing grey pigment, prepared in accordance with the example, is discharged from the hopper 7 over the second layer at a rate of 0.10 lb./ft.². The three layers of colored vinyl dry blend mix on the steel belt are then passed between radiant heaters 10 which are maintained at 600 to 750° F. and the vinyl dry blend material is heated thereby to between 350 to 450° F. at which point the resin is in a fused and substantially fluid state. At this point the three layers are extruded between the steel belt 8 and an idler roll 11 and a driven steel consolidator roll 12 where the substantially fluid dry blend is extruded and consolidated into an integral vinyl sheet having three distinct layers. After the three layers are consolidated and fused into an integral sheet, the sheet is passed over cooling means, which can be a cooling water spray directed onto the steel belt, as shown at 16, and thence to a windup roll 17. The steel belt and the steel consolidator roll are both driven at substantially the same rate.

Two views of a portion of the sheet formed in accordance with the above example are shown in FIGURES 2 and 3. As shown therein, the vinyl sheet is homogeneously fused throughout and the distinct red, white and grey layers 13, 14, and 15, formed from the vinyl dry blend mixes of differing composition, are intimately bonded to each other. FIGURE 3 is a top plan view of a section of the sheet material having portions cut therefrom such that the distinct layers are visible at 13, 14, and 15.

In another embodiment of this invention I have succeeded in forming a decorative sheet material having an exceptionally high luster or reflectivity by what may be termed a novel intra-leafing technique. In accordance with my invention, a free-flowing mix of unfused resin particles formed from a suitable thermoplastic vinyl resin, liquid plasticizer, and vinyl stabilizer is laid up as a layer on a suitable carrier. Next, a substantially continuous layer of leafing metallic pigment is formed upon the initial layer of plasticized vinyl resin particles and a second layer of free-flowing plasticized unfused vinyl resin particles is laid up upon the substantially continuous leafing metallic pigment layer. The three layers of material are then heated by passing the carrier between heaters which heat and fuse the layers of plasticized thermoplastic vinyl resin particles to a substantially fluid state at which point the layers are extruded between the carrier and a suitable consolidating roll. The extrusion of the substantially fluid resin layers acts to consolidate and bond the vinyl resin layers and also mechanically leafs the metallic leafing pigment so as to form a continuous simulated foil color layer encased between the two outer fused thermoplastic vinyl resin layers.

The pigments utilized in practicing this embodiment of the invention are metallic leafing pigments commonly used for simulated foil surfaces and preferably are highly polished lubricated platelets of aluminum, copper, or copper-containing alloys, the latter alloys being the commercial bronze pigments. The term "leafing" generally refers to the ability of the particular pigments to float to the surface of certain paint vehicles to give a high luster and generally is a measure of the metallic luster of this class of pigments. Stearic acid is a typical lubricant used for treating such platelets.

In order that this embodiment of the invention may be readily understood, certain embodiments of the method will be described in conjunction with the attached drawing.

PREPARATION OF PLASTICIZED VINYL DRY BLEND

Example 2

The following formula will provide a composition suitable for use as the plasticized vinyl dry blend, all parts being given by weight:

| Ingredients: | Parts by weight |
|---|---|
| Polyvinyl chloride homopolymer (discrete particles of from 200 microns to 75 microns prepared by suspension polymerization; specific viscosity .329 to .349 as determined by ASTM D–1243–54) | 100 |
| Plasticizer—dioctyl phthalate | 20 |
| Plasticizer—epoxidized soybean oil | 6.5 |
| Stabilizer—liquid barium-cadmium phosphate | 4.8 |

In the preparation of the vinyl dry blend composition, the above ingredients are mixed in a Henschel blender at 220° F. for 3 minutes at the end of which time the ingredients are discharged in the form of discrete dry blend particles. The mild heat causes the plasticizer and stabilizer to be diffused throughout the resin particles without fusing the vinyl resin. Generally speaking, no pigmentation is used in forming the dry blend although a small amount of toner pigment, up to .001 part per 100 parts of resin, stabilizer, and plasticizer, may be incorporated in the mixture so that when the dry blend is sheeted the appearance of the metallic color layer will be modified by the translucent effect given the fused thermoplastic dry blend by the addition of the toner pigment.

SHEET FORMATION

In forming the decorative sheet material in accordance with this invention and with reference to the drawing, a layer of vinyl dry blend prepared in accordance with the example is discharged from the hopper 5 and deposited at a rate of 0.13 lb./ft.$^2$ on a steel belt 8 driven by means of roll 9. A substantially continuous layer of a bronze leafing metallic pigment which has been diluted and blended with the above-described vinyl dry blend, 1 part pigment to 20 parts dry blend, is deposited from hopper 6 thereover at a rate of .04 lb./ft.$^2$. Over the layer of leafing metallic pigment, a second layer of dry blend is laid up from hopper 7 at a rate of 0.13 lb./ft.$^2$. The three layers on the steel belt are then passed between radiant heaters 10 which are maintained at 425 to 450° F. and the vinyl dry blend material is heated thereby to between 350° to 375° F. at which point the resin is in a fused and substantially fluid state. At this point the three layers are extruded between the steel belt and an idler roll 11 and a driven consolidator roll 12 where the substantially fluid dry blend is extruded and consolidated into integral vinyl sheets while the leafing metallic pigment is simultaneously leafed, the pigment platelets all being oriented in a substantially single plane, to form a composite color layer between the vinyl layers. After the three layers are consolidated, fused, and the pigment leafed, the integral sheet is passed over cooling means as shown at 16 and thence to a windup roll 17.

Although the leafing metallic pigment can be used by itself to form the color layer, it may be diluted with up to 500 parts by weight of vinyl dry blend particles, based on 1 part by weight pigment, to feed more economically.

FIGURE 4 shows a cross section of the finished vinyl sheet having the two substantially transparent thermoplastic vinyl resin outer layers, 18 and 19, intimately bonded to the leafed metallic pigment layer 20. The finished sheet has the appearance of a bronze metallic foil.

I claim:

1. The method of producing a decorative thermoplastic vinyl resin sheet having a plurality of distinct layers of fused and consolidated thermoplastic vinyl resin composition comprising
   A. laying up a plurality of continuous layers of a free-flowing thermoplastic vinyl resin mix on a nonporous carrier, said free-flowing mix being comprised of porous particles of unfused thermoplastic vinyl resin, liquid vinyl plasticizer, vinyl stabilizer, pigment and filler, with each of said plurality of layers being of different pigmentation from adjacent layers,
   B. heating said layers to a temperature at which the resin particles fuse and become substantially fluid, and
   C. extruding said layers between the carrier and a nonporous consolidating roll while the resin particles are substantially fluid and controlling the extrusion such that substantially no mixing occurs between adjacent layers.

2. The method in accordance with claim 1 in which the free-flowing mix is formed from, in relative proportions, 100 parts by weight of particles of an unfused thermoplastic vinyl resin, 15 to 30 parts by weight of liquid vinyl plasticizer, 2 to 5 parts by weight of vinyl stabilizer, 0 to 5 parts by weight pigment, and 0 to 25 parts by weight filler.

3. The method in accordance with claim 2 in which the resin particles are particles of a vinyl chloride homopolymer prepared by emulsion polymerization.

4. The method in accordance with claim 2 in which the resin particles are particles of a vinyl chloride homopolymer prepared by suspension polymerization.

5. The method of producing a decorative thermoplastic vinyl resin sheet material having a high metallic luster comprising
   A. forming, on a suitable nonporous carrier, a first layer comprised of a free-flowing homogeneous mixture of unfused thermoplastic vinyl resin particles, liquid vinyl plasticizer, and vinyl stabilizer, a second substantially continuous layer of leafing metallic pigment, and a third layer of a free-flowing homogeneous mixture of unfused thermoplastic vinyl resin particles, liquid vinyl plasticizer, and vinyl stabilizer.
   B. heating said layers to a temperature at which said particles of thermoplastic vinyl resin fuse and become substantially fluid, and
   C. extruding the layers between the carrier and a nonporous consolidating roll to mechanically leaf said metallic pigment and to consolidate the vinyl resin into continuous sheets integrally bonded to the intermediate leafed metallic pigment layer.

6. The method in accordance with claim 5 in which the free-flowing homogeneous mixture of unfused thermoplastic vinyl resin particles, liquid vinyl plasticizer, and vinyl stabilizer, is formed from, in relative proportions, 100 parts by weight of particles of unfused thermoplastic vinyl resin, 15 to 30 parts by weight of liquid vinyl plasticizer and 2 to 5 parts by weight of vinyl stabilizer.

7. The method in accordance with claim 6 in which the resin is a member selected from the group consisting of vinyl chloride homopolymers prepared by emulsion polymerization and vinyl chloride homopolymers prepared by suspension polymerization.

8. The method in accordance with claim 6 in which the free-flowing homogeneous mixture additionally contains up to 0.001 part pigment per 100 parts of resin, stabilizer, and plasticizer.

9. The method in accordance with claim 6 in which the substantially continuous layer of metallic leafing pigment is diluted with up to 500 parts of a free-flowing homogeneous mixture of unfused thermoplastic vinyl resin particles, liquid vinyl plasticizer, and vinyl stabilizer, based on 1 part by weight of the leafing metallic pigment.

References Cited

UNITED STATES PATENTS

| | | | |
|---|---|---|---|
| 2,183,520 | 12/1939 | Van Derhoef | 264—112 |
| 3,192,294 | 6/1965 | Streed et al. | 264—126 X |
| 3,194,856 | 7/1965 | Palmer | 264—112 |

FOREIGN PATENTS

| | | |
|---|---|---|
| 94,628 | 7/1959 | Norway. |

ROBERT F. WHITE, *Primary Examiner.*

J. A. FINLAYSON, G. AUVILLE, *Assistant Examiners.*